(12) United States Patent
Wei et al.

(10) Patent No.: US 8,535,491 B2
(45) Date of Patent: Sep. 17, 2013

(54) ELECTROCHEMICAL MACHINING ASSEMBLY WITH CURVED ELECTRODE

(75) Inventors: Bin Wei, Mechanicville, NY (US); Gary Charles Liotta, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 1034 days.

(21) Appl. No.: 12/562,528

(22) Filed: Sep. 18, 2009

(65) Prior Publication Data

US 2011/0070096 A1 Mar. 24, 2011

(51) Int. Cl.
*B23H 9/16* (2006.01)
(52) U.S. Cl.
USPC ..................... 204/224 M; 205/665
(58) Field of Classification Search
USPC ..................... 204/224 M; 205/665
See application file for complete search history.

(56) References Cited

U.S. PATENT DOCUMENTS

| | | | |
|---|---|---|---|
| 4,769,118 A * | 9/1988 | Johns | 205/665 |
| 5,059,289 A | 10/1991 | Gaskell | |
| 5,143,512 A * | 9/1992 | Corsmeier et al. | 415/115 |
| 5,637,239 A | 6/1997 | Adamski et al. | |
| 6,200,439 B1 | 3/2001 | Wei et al. | |
| 6,303,193 B1 | 10/2001 | Guida et al. | |
| 6,554,571 B1 | 4/2003 | Lee et al. | |
| 2003/0200753 A1 | 10/2003 | Eidelman et al. | |
| 2007/0137172 A1 | 6/2007 | Rasheed et al. | |
| 2007/0180832 A1 | 8/2007 | Kenyon et al. | |
| 2007/0256939 A1 * | 11/2007 | Wei et al. | 205/674 |
| 2010/0316502 A1 * | 12/2010 | Khanhson et al. | 416/90 R |

FOREIGN PATENT DOCUMENTS

| DE | 3531761 A | * | 3/1987 |
| DE | 4428207 A1 | * | 2/1996 |

OTHER PUBLICATIONS

M. Uchiyama et al., "Development of an electromachining method for machining curved holes," Journal of Materials Processing Technology, vol. 149, Issue 1-3, pp. 453-459, Jun. 10, 2004.
H. Sasahara et al., "Electrochemical Curved Hold Machining with Electrode Posture Control System," The Japan Society of Mechanical Engineers, ISSN: 03875024, vol. 73, No. 9, Sep. 2007, pp. 207-212.

* cited by examiner

*Primary Examiner* — Nicholas A Smith
(74) *Attorney, Agent, or Firm* — Penny A. Clarke

(57) ABSTRACT

An electrode for an electrochemical machining process is provided. The electrode comprises a curved, electrically conductive member, and an insulating coating covering at least a portion of a side surface of the curved, electrically conductive member. An electrochemical machining assembly is also provided for machining curved holes in a workpiece. The assembly includes at least one curved electrode and a power supply operatively connected to provide a pulsed voltage to the at least one curved electrode and to the workpiece. The assembly further includes a rotational driver operatively connected to move the at least one curved electrode along a curved path within the workpiece. The assembly is configured to remove material from the workpiece upon application of the pulsed voltage to the at least one curved electrode and to the workpiece. An electrochemical machining method is also provided for forming one or more curved holes in an electrically conductive workpiece.

18 Claims, 5 Drawing Sheets

ELECTROCHEMICAL MACHINING ASSEMBLY WITH CURVED ELECTRODE

BACKGROUND

The invention relates generally to electrochemical machining. More particularly, the invention relates to an electrode, an electrochemical machining assembly and an electrochemical machining method for forming curved holes.

A specialized adaptation of electrochemical machining, known as shaped-tube electrochemical machining (STEM), is used for drilling small, deep holes in electrically conductive materials. STEM is a non-contact electrochemical drilling process that can produce holes with aspect ratios as high as 300:1. It is the only known method that is capable of manufacturing the small, deep holes used for cooling blades of efficient gas turbines.

The efficiency of a gas turbine engine is directly proportional to the temperature of turbine gases channeled from the combustor of the engine and flowing over the turbine blades. For example, for gas turbine engines having relatively large blades, turbine gas temperatures approaching 1500° C. (2,700° F.) are typical. To withstand such high temperatures, these large blades are manufactured from advanced materials and typically include state-of-the-art type cooling features.

A turbine blade is typically cooled using a coolant such as compressor discharge air. The blade typically includes a cooling hole through which the air passes. A further design advancement has been the addition of internal ridges in the cooling hole to effect turbulent flow through the hole and increase cooling efficiency. Cooling features within the hole such as turbulence promoting ribs, or turbulators, thus increase the efficiency of the turbine.

The cooling holes commonly have an aspect ratio, or depth to diameter ratio, as large as 300:1, with a diameter as small as a few millimeters. The turbulators extend from sidewalls of the hole into the air passage about 0.2 millimeters (mm), for example.

The method currently used for drilling the cooling holes in turbine blades is a shaped-tube electrochemical machining (STEM) process. In this process, an electrically conductive workpiece is situated in a fixed position relative to a movable manifold. The manifold supports a plurality of drilling tubes, each of which are utilised to form an aperture in the workpiece. The drilling tubes function as cathodes in the electrochemical machining process, while the workpiece acts as the anode. As the workpiece is flooded with an electrolyte solution from the drilling tubes, material is depleted from the workpiece in the vicinity of the leading edge of the drilling tubes to form holes.

Existing STEM processes and assemblies are capable only of drilling straight holes. However, it would be desirable to have the capability to drill curved holes that would better conform to the workpiece geometry to enhance cooling of hot areas, such as gas turbine blade platforms. Accordingly, it would be desirable to provide an improved electrochemical machining assembly and method to form curved holes in electrically conductive workpieces.

BRIEF DESCRIPTION

Briefly, one aspect of the invention resides in an electrode for an electrochemical machining process. The electrode comprises a curved, electrically conductive member and an insulating coating covering at least a portion of a side surface of the curved, electrically conductive member.

Another aspect of the invention resides in an electrochemical machining assembly for machining curved holes in a workpiece. The assembly includes at least one curved electrode and a power supply operatively connected to provide a pulsed voltage to the at least one curved electrode and to the workpiece. The electrochemical machining assembly further includes a rotational driver operatively connected to move the at least one curved electrode along a curved path within the workpiece. The electrochemical machining assembly is configured to remove material from the workpiece upon application of the pulsed voltage to the at least one curved electrode and to the workpiece.

Yet another aspect of the invention resides in an electrochemical machining method for forming one or more curved holes in an electrically conductive workpiece. The method includes the steps of supplying a pulsed voltage to one or more curved electrodes and to the workpiece to electroerode portions of the workpiece to define the one or more curved holes in the workpiece, and rotationally driving respective ones of the one or more curved electrodes to advance the respective electrode along a curved path within the workpiece.

DRAWINGS

These and other features, aspects, and advantages of the present invention will become better understood when the following detailed description is read with reference to the accompanying drawings in which like characters represent like parts throughout the drawings, wherein:

FIG. 1 illustrates an example electrochemical machining assembly embodiment of the invention;

FIG. 2 schematically depicts an example, curved electrode for use in the electrochemical machining assembly of FIG. 1;

FIG. 3 is a block diagram illustrating additional elements of the electrochemical machining assembly of FIG. 1;

FIG. 4 schematically depicts an example reservoir configuration;

FIG. 5 schematically depicts an example guide bush to guide the curved electrode of FIG. 2 in the electrochemical machining assembly of FIG. 1;

Figure 1:
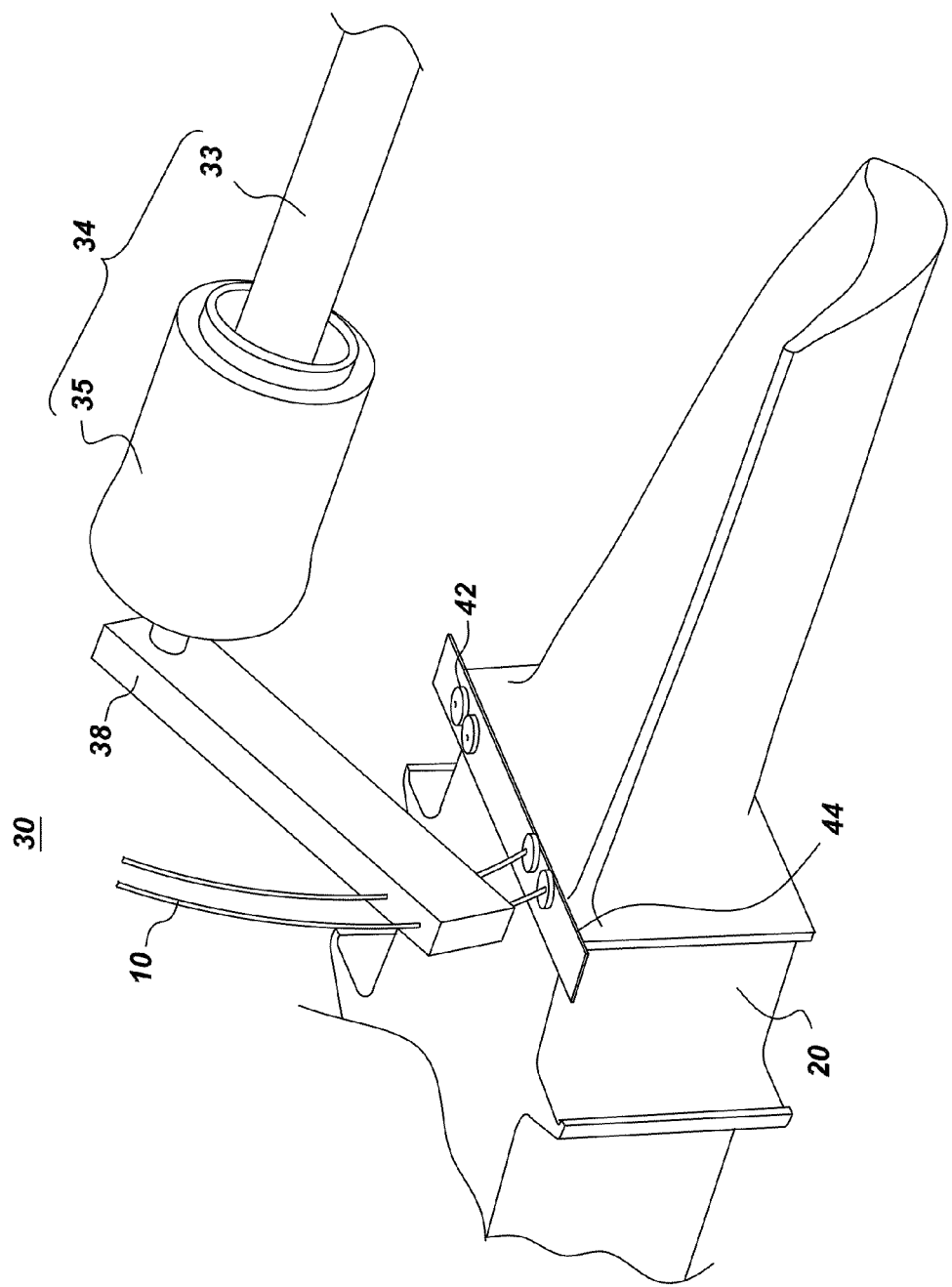
Figure 9:
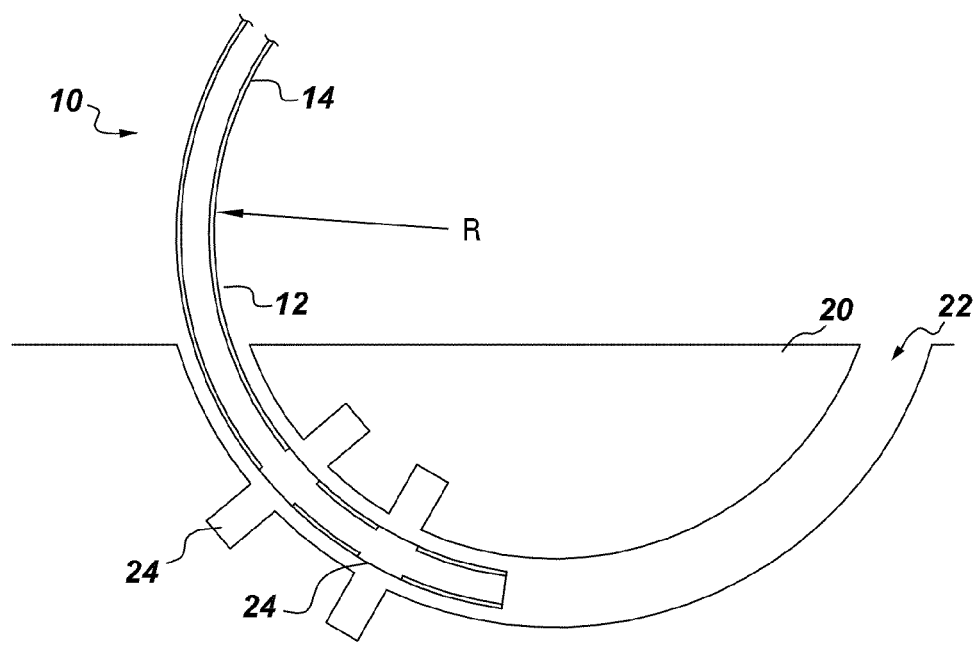

FIG. 9 schematically depicts another example, curved electrode for use in the electrochemical machining assembly of FIG. 1 and for forming turbulated ridges in a curved cooling passage.

DETAILED DESCRIPTION

An electrode 10 for an electrochemical machining process is described with reference to FIG. 2. As shown for example in FIG. 2, the curved electrode 10 includes a curved, electrically conductive member 12. As used here, the term "curved" means that the electrically conductive member 12 is not cylindrical (or straight), as is the case for conventional shaped tube electrochemical machining (STEM) electrodes, as shown for example in commonly assigned U.S. Pat. Nos. 6,200,439 and 6,303,193, but rather is characterized by a radius of curvature, R, as shown for example in FIG. 2. The radius of curvature, R, will vary based on the application and the corresponding radius of curvature of the curved hole 22 to be drilled in the workpiece 20. The curved electrode 10 further includes an insulating coating 14 covering at least a portion of a side surface of the curved, electrically conductive member 12. For the example configuration shown in FIG. 2, the insulating coating extends over the entire exposed side surface of conductive member 12, whereas for the example arrangement shown in FIG. 9, the insulating coating 14 is partially removed to expose select portions of conductive member 12. Non-limiting examples of the insulating coating 14 include dielectric materials, which dielectric material should preferably be smooth, of even thickness, tightly adhered to the surface of the body and free of pinholes or foreign material. Exemplary suitable dielectric materials include polyethylene, polytetrafluoro-ethylene, ceramics, and various types of rubber.

The present invention is not limited to any particular workpiece 20 but rather can be used to form curved holes 22 in a variety of electrically conductive workpieces 20, including without limitation, gas turbine components. Non-limiting examples of suitable materials for forming the electrically conductive components 20 include metals and metal alloys.

According to a particular embodiment, the curved, electrically conductive member 12 is hollow and is configured to receive an electrolyte, and the curved, electrically conductive member 12 comprises a corrosion resistant material. By "corrosion resistant," it is meant that the material is resistant to electrolytic action. Non-limiting examples of a corrosion resistant material suitable for forming curved member 12 include titanium and titanium alloys. The electrolyte for STEM machining operations is typically an acidic solution. By way of example, an acid electrolyte, such as $HNO_3$ or $H_2SO_4$ solution (8-20 weight percent) can be used.

For particular embodiments, the curved, electrically conductive member 12 has a non-circular cross-section. For example, the cross-section of the electrode may be elliptical, oval, race-track or extended oval in shape. Benefits of such non-circular cross sections include enhanced cooling for various part (workpiece 20) geometries. In other embodiments the electrode 10 may have a circular cross-section.

For the example configuration shown in FIG. 9, the side surface of the curved, electrically conductive member 12 is only partially covered with the insulating coating 14. As discussed for example, in commonly assigned U.S. Pat. Nos. 6,200,439 and 6,303,193, which are hereby incorporated by reference in their entirety, by exposing portions of the sides of the electrically conductive portion of a STEM electrode, turbulated ridges 24 can be efficiently formed in the stem holes 22 in the workpiece 20. By way of background, turbulated ridges 24 (or turbulators) are cooling features within a cooling hole that promote turbulence within the cooling hole and thus enhance cooling, which in turn increases the efficiency of a turbine engine, for example, by increasing the temperature at which the turbine engine can be run. In addition, turbulated ridges 24 can be formed by cyclically changing voltage and/or tool feed rate.

Benefits of the curved electrode 10 over conventional cylindrical STEM electrodes include the ability to drill curved STEM holes 22. Desirably, the curved STEM holes 22 can cover the critical hot areas of a component (for example gas turbine blades and vanes) with optimal cooling surface coverage.

An electrochemical machining assembly 30 embodiment of the invention is described with reference to FIGS. 1 and 3. Beneficially, the electrochemical machining assembly 30 can be used to machine curved holes (cooling passages) 22 in a workpiece 20, to enhance cooling in critical hot areas of the workpiece. As indicated in FIGS. 1 and 3, the electrochemical machining assembly 30 includes at least one curved electrode 10. For the illustrated example of FIG. 1, the electrochemical machining assembly 30 includes four curved electrodes 10. However, this example is merely illustrative. The curved electrode 10 is discussed in detail above with reference to FIGS. 2 and 9.

As shown for example in FIG. 3, the electrochemical machining assembly 30 further includes a power supply 32 operatively connected to provide a pulsed voltage to the at least one curved electrode 10 and to the workpiece 20. In one non-limiting example, the power supply 32 is a bipolar, pulsed power supply.

Figure 2:
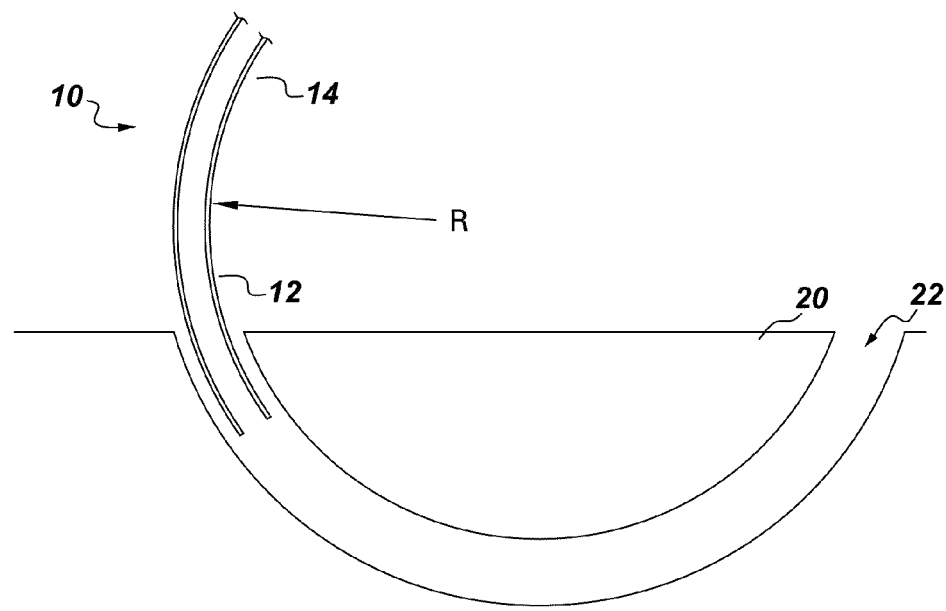
Figure 3:
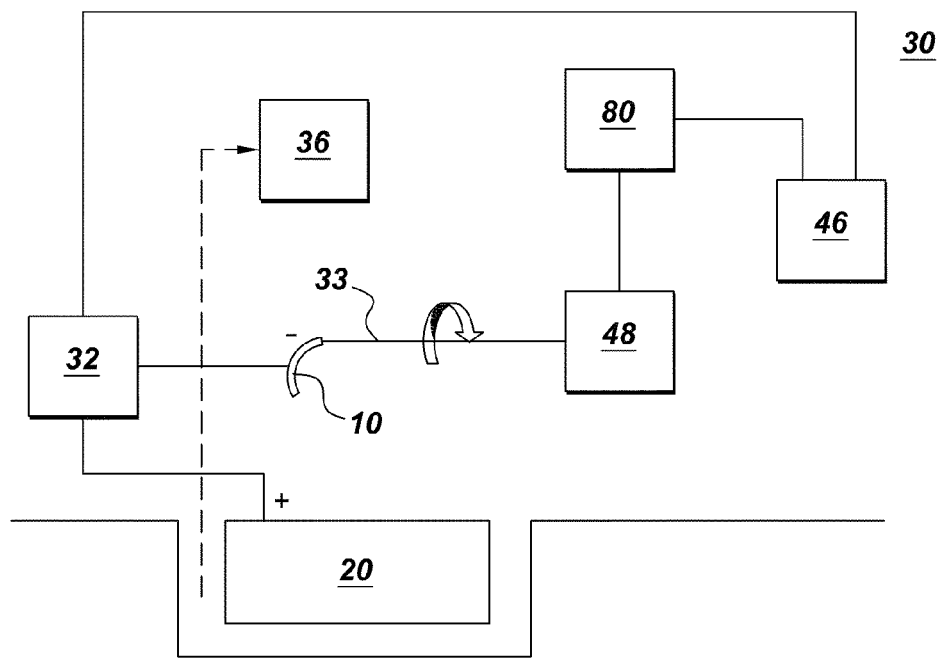

As shown for example in FIGS. 1 and 3, the electrochemical machining assembly 30 further includes a rotational driver 34 operatively connected to move the at least one curved electrode 10 along a curved path within the workpiece 20, as indicated for example, in FIG. 2. For the example arrangement shown in FIG. 1, the rotational driver 34 comprises a shaft 33 configured to rotate and a collet 35 mounted on the shaft 33, wherein the collet 35 is operatively connected to the reservoir 38. The shaft 33 may in turn be driven by a motor 48, as indicated for example in FIG. 3. In addition, the shaft 33 may be driven by motor 48 through, optionally, a reduction gear box (not shown). These particular configurations for the rotational driver 34 are intended as examples, and the invention is not limited to these specific mechanisms for rotationally driving the electrode 10. Rather, a variety of rotational driving mechanisms can be employed, provided they are suitable for moving the curved electrode(s) 10 along a curved path within the workpiece 20. Further, as used here, the phrase "operatively connected" should be understood to mean that the respective components may be connected (for example, mechanically or electrically) directly or may be connected via other components. In addition, to set up the drilling operation, the workpiece 20 will move relative to the electrode 10 to position the electrode 10 at the desired position. Typically, during a drilling operation, only the rotational motion will be necessary. In addition, the motion controls from conventional STEM machines may be employed. The electrochemical machining assembly 30 is thus configured to remove material from the workpiece 20 upon application of the pulsed voltage to the at least one curved electrode 10 and to the workpiece 20.

As discussed above with reference to FIG. 2, for certain embodiments the curved electrode(s) 10 is (are) hollow to receive and convey an electrolyte to the machining point. For the configuration shown in FIG. 3, the electrode(s) 10 is (are) hollow, and the electrochemical machining assembly 30 further includes an electrolyte fluid source 36 in fluid connection with the curved, hollow electrode(s) for supplying an electrolyte to the curved, hollow electrode(s). In one non-limiting example, the electrolyte fluid source 36 comprises a pump. The electrolyte fluid source 36 may contain additional elements (not shown) for conditioning and recirculating the electrolyte, such as one or more filters (not shown)

Figure 4:
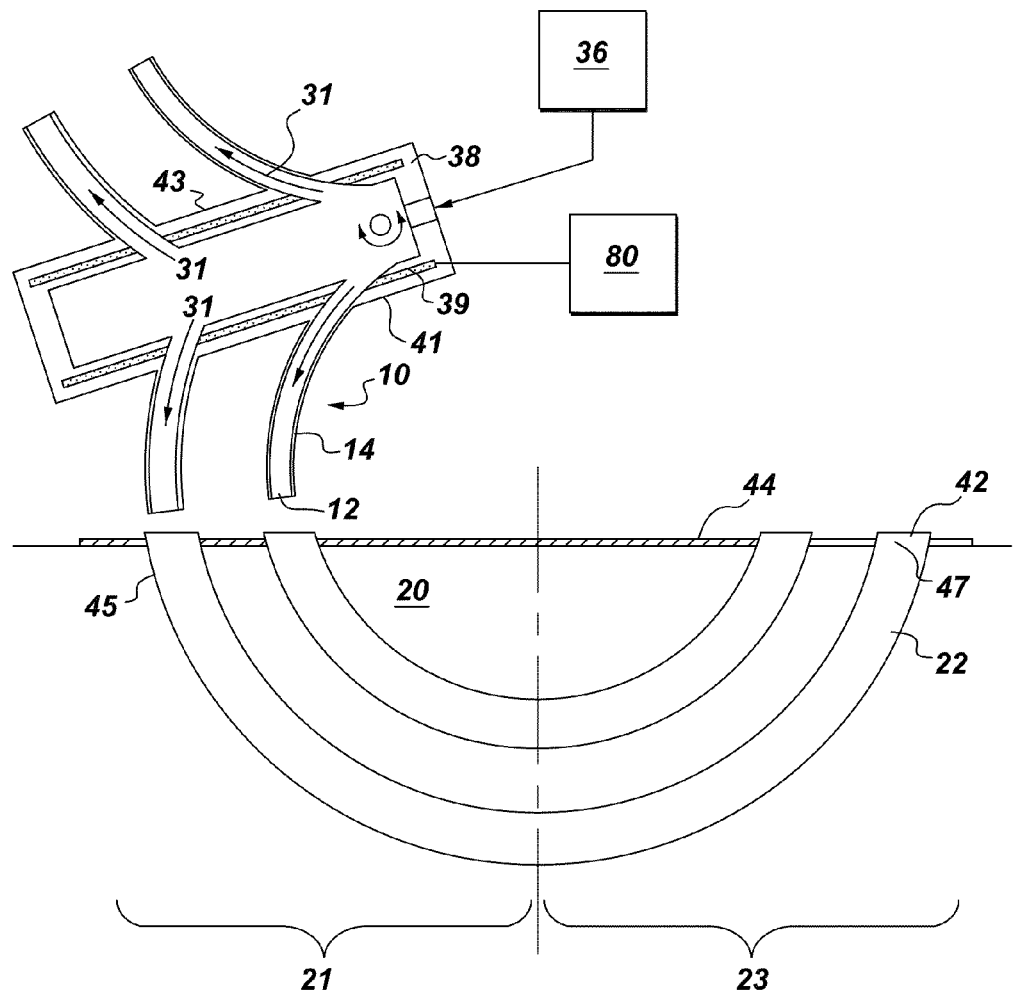

For the example configuration shown in FIG. 1, the electrochemical machining assembly 30 further includes a reservoir 38 operatively connected to the rotational driver 34 and to the curved, hollow electrode(s) 10 to move the curved electrode(s) 10 along the curved path within the workpiece 20. An example reservoir is schematically depicted in FIG. 4. As indicated, the reservoir 38 is in fluid connection with the electrolyte fluid source 36 to receive the electrolyte from the electrolyte fluid source 36 and to supply the electrolyte to the electrode(s) 10. For the illustrated example, the electrochemical machining assembly 30 further includes a bus 39 electrically connected to the power supply 32 and to the curved, hollow electrode(s) 10 to supply the pulsed voltage to the electrode(s) 10. For the example configuration shown in FIG. 4, the bus 39 is at least partially disposed in the reservoir 38. More particularly, for the arrangement shown in FIG. 4, the insulating coating 14 is removed from the ends of the electrodes 10 to expose the end of the conductive members 12 for electrical connection to the bus 39. More particularly, the reservoir 38 shown in FIG. 4 defines a number of openings 31. As shown, each of the curved, hollow electrodes 10 extends through a respective one of the openings 31. As indicated, for example, in FIG. 1, the rotational driver 34 is operatively connected to the reservoir 38 to move each of the curved, hollow electrodes 10 along the respective curved paths within the workpiece 20.

For the illustrative example shown in FIGS. 1 and 4, two openings 31 are disposed in a first side 41 of the reservoir 38, such that two of the curved, hollow electrodes 10 extend from the first side 41 of the reservoir 38, as shown. It should be noted that this is merely an example, and the invention is not limited to a specific number of openings 31 or electrodes 10 but rather these will vary based on the specific application. Similarly, for the example shown in FIGS. 1 and 4, two openings 31 are disposed in a second side 43 of the reservoir 38, and two curved, hollow electrodes 10 extend from the second side 43 of the reservoir 38. As indicated, for example, in FIG. 4, the electrodes 10 extending from the first side 41 of the reservoir are configured to machine a first portion 21 of a number of curved holes 22 in the workpiece 20. Similarly, the electrodes 10 extending from the second side 43 of the reservoir 38 are configured to machine a second portion 23 of the curved holes in the workpiece. As indicated in FIG. 4, each of the respective first and second portions 21, 23 intersect to form a respective curved hole 22. In this manner, a curved hole 22 can be machined from both ends of the curved hole 22.

Figure 5:
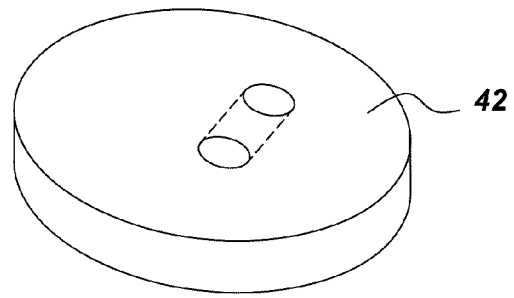
Figure 6:
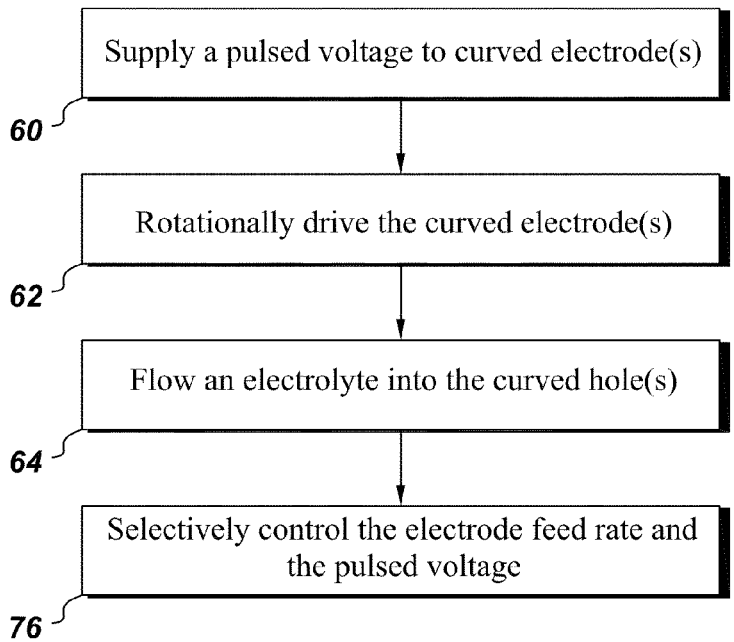
FIG. 6 is a flow chart illustrating steps of an electrochemical machining method embodiment of the invention for forming curved holes in a workpiece.

As indicated for example in FIGS. 1 and 4, the electrochemical machining assembly 30 may further include a number of guides 42 for guiding respective ones of the electrodes 10 extending from the first side 41 of the reservoir 38 to a first initial machining point 45 on the workpiece 20, and for guiding respective ones of the electrodes 10 extending from the second side 43 of the reservoir 38 to a second initial machining point 47 on the workpiece 20. More generally, the electrochemical machining assembly 30 may include at least one guide 42 configured to guide the at least one curved electrode 10 to an initial machining point 45, 47 on the workpiece 20. In one non-limiting example, the guides 42 are guide bushes 42, as shown for example in FIGS. 1 and 5.

For the example configuration shown in FIG. 1, the electrochemical machining assembly 30 further includes a protective plate 44 for removably disposing on a machining site of the workpiece 20. For the illustrated arrangement, the guides 42 are mounted on the protective plate 44. The protective plate 44 may be formed of a corrosion resistant material, such as Teflon®, plastic or ceramic materials. Teflon® is a material marked by E. I. du Pont de Nemours and Company, which is headquartered in Wilmington, Del.

Referring again to the schematic diagram shown in FIG. 3, the electrochemical machining assembly 30 may further include a controller 46 operatively connected to the rotational driver 34 and configured to control movement of the rotational driver. For example and as indicated in FIG. 3, the controller 46 may be connected to a motor 48 used to drive the rotational driver 34. For the arrangement shown in FIG. 3, the controller 46 is connected to the power supply 80 used to power the motor 48. As such, the controller 46 controls the feed-rate of the electrode(s) 10. In one non-limiting example, the controller 46 comprises a computerized numerical controller (CNC) 46, which is operatively connected to the motor 48 and to the bipolar power supply 32. Beneficially, the CNC 46 can be programmed to manipulate the rotational driver 34 in a manner, which enables the workpiece 20 to be shaped via electrochemical corrosion, such that curved holes 22 (not shown in FIG. 3) can be quickly and economically produced.

It should be noted that the present invention is not limited to any particular controller for performing the processing tasks of the invention. For certain embodiments, the controller includes one or more processors. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art. In other embodiments, the controller is preprogrammed to perform the tasks of the invention.

For the example arrangement shown in FIG. 3, the controller 46 is operatively connected to the bipolar power supply 32 and is further configured to perform pulse train control. In this manner, the controller 46 controls the pulse duration, frequency and voltage of the pulsed voltage supplied to the electrodes 10 and workpiece 20. In addition and for particular embodiments, the controller 46 may be further configured to selectively control a feed rate for the curved electrode(s) 10 and/or the pulsed voltage supplied to the curved electrode(s) 10 to form one or more turbulated ridges 24 in a curved hole being machined in the workpiece 20. An example turbulated ridge 24 is shown in FIG. 9. As noted above, turbulated ridges 24 enhance cooling within a cooling hole, thereby increasing the overall efficiency of a turbine engine, for example.

In addition to the features discussed above, the electrochemical machining assembly 30 may include additional elements, including without limitation, a graphical or other display, such as CRT graphical display (not shown) to monitor signals provided by any of the components of the assembly previously described. Such a graphical or other display may provide diagnostic information to a machine operator to ascertain that each electrode is performing properly, or to fulfill some other diagnostic purpose.

An electrochemical machining method embodiment of the invention is described with reference to FIG. 1-7. As discussed in detail below, the electrochemical machining method can be used for forming one or more curved holes 22 in an electrically conductive workpiece 20. As indicated for example in FIG. 6, the method includes at step 60, supplying a pulsed voltage to one or more curved electrodes 10 and to the workpiece 20 to electroerode portions of the workpiece 20 to define the one or more curved holes 22 in the workpiece 20. Example curved holes 22 are indicated in FIGS. 2 and 4. The method further includes at step 62, rotationally driving respective ones of the one or more curved electrodes 10 to advance the respective electrode 10 along a curved path within the workpiece 20. Techniques for rotationally driving the electrodes 10 are discussed above with reference to the electrochemical machining assembly embodiment. The method further includes at step 64, flowing an electrolyte into the one or more curved holes 22 to remove the electroeroded portions of the workpiece 20 from the respective curved hole 22. This can be performed using the electrolyte fluid source 36, as discussed above with reference to FIG. 3, for example.

Figure 7:
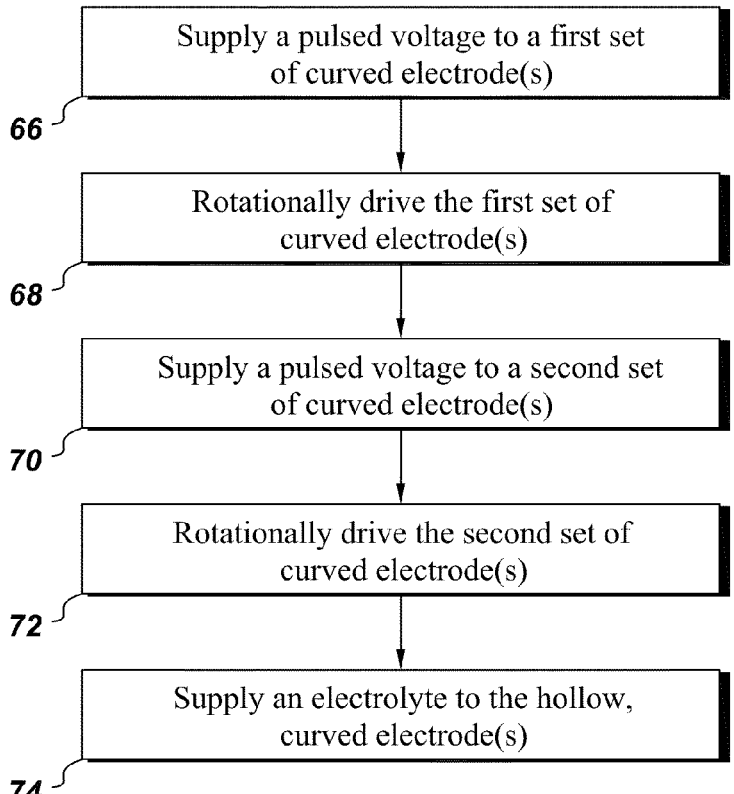
FIG. 7 illustrates optional machining steps for the electrochemical machining method of FIG. 6.

Optional machining steps 66-74 are described with reference to FIG. 7. More particularly, the supply step 62 and rotationally drive step 64 of the electrochemical machining method of FIG. 6 can optionally comprise respective ones of steps 66-72. For the particular embodiment depicted in FIGS. 4 and 7, the method includes at step 66, supplying the pulsed voltage to a first set of curved electrodes 10 and to the workpiece 20 to electroerode portions of the workpiece 20 to define one or more first portions 21 of respective ones of the one or more curved holes 22 in the workpiece 20. The first set of electrodes may include one or more electrodes 10. In the example shown in FIG. 4, the first set consists of two electrodes 10. As shown in FIG. 7, the method includes at step 68, rotationally driving the first set of curved electrodes 10 to advance the respective electrode(s) along a first portion of the curved path(s) within the workpiece. The method further includes at step 70, supplying the pulsed voltage to a second set of the curved electrodes 10 and to the workpiece 20 to electroerode portions of the workpiece to define one or more second portions 23 of respective ones of the one or more curved holes in the workpiece. The second set of electrodes may include one or more electrodes 10. In the illustrated example of FIG. 4, the second set consists of two electrodes 10. As shown in FIG. 7, the method further includes at step 72, rotationally driving the second set of curved electrodes 10 to advance the respective electrode(s) 10 along a second portion of the curved path(s) within the workpiece 10. As indicated in FIG. 4, each of the respective first and second portions 21, 23 intersect to form a respective curved hole 22. Beneficially, using the method of FIG. 7, a curved hole 22 can be machined from both ends of the curved hole 22.

According to a more particular embodiment, steps 68 and 72 may be performed by rotationally driving each of the curved electrodes using a common rotational driver 34, as discussed above for example with reference to FIGS. 1 and 3. For particular embodiments, the one or more curved electrodes 10 are hollow, and the electrochemical machining method further includes, at optional step 74, supplying an electrolyte to the curved, hollow electrode(s) 10 via a common reservoir 38, as discussed above for example with reference to FIG. 4. In addition, the pulsed voltage may be supplied, at steps 66 and 70, to the curved, electrode(s) 10 via a common bus 39, as discussed above with reference to FIG. 4.

In addition, the electrochemical machining method may further include, at optional step 76, selectively controlling a feed rate for the curved electrode(s) 10 and/or the pulsed voltage supplied to the curved electrode(s) to form one or more turbulated ridges 24 in the respective curved hole 22 being machined in the workpiece 20. Turbulated ridges 24 are discussed above with reference to FIG. 9. Step 76 may be performed, for example, using a controller 46, as discussed above with reference to FIG. 3.

Figure 8:
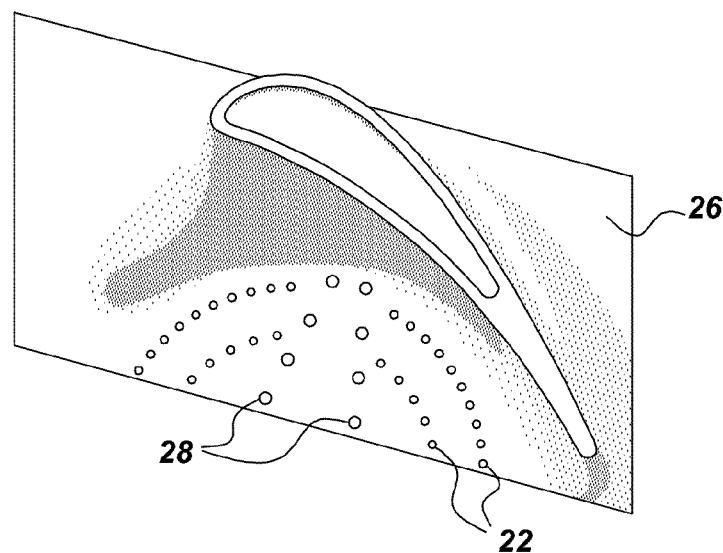
FIG. 8 depicts a turbine blade platform, looking down on the platform.

The curved electrode and electrochemical machining method and assembly of the present invention can be used to form curved holes in a variety of components. One class of components includes components subject to high temperatures (for example, gas turbine components), which thus require cooling passages. The curved holes 22 formed using the curved electrode, electrochemical machining assembly and method of the present invention provide enhanced cooling. Depending on the application, the component (workpiece) 20 may define one or more curved holes 22 formed using the above-described electrochemical machining process. One non-limiting example of a component 20 that benefits from the curved holes 22 is a gas turbine blade 20, which is shown in FIG. 1. FIG. 8 depicts a platform of the turbine blade (bucket) 20, looking down on the platform. For the example arrangement shown in FIG. 8, multiple curved cooling holes 22 are formed in the platform 26. For the illustrated arrangement, the curved cooling holes 22 are in fluid connection with one or multiple adjoining cooling holes 28. However, in other arrangements, the curved cooling holes 22 may be in fluid communication with the bucket cooling system by direct connection to the bucket cooling system. In other arrangements, the curved cooling holes 22 may be in fluid communication with the bucket cooling system via curved connector cooling holes (not shown).

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrochemical machining assembly for machining curved holes in a workpiece, the assembly comprising:
   at least one curved, hollow electrode comprising curved, hollow, electrically conductive member and an electrically insulating coating covering at least a portion of a side surface of the curved, electrically conductive member;
   a power supply operatively connected to provide a pulsed voltage to the at least one curved, hollow electrode and to the workpiece;
   a rotational driver operatively connected to move the at least one curved, hollow electrode along a curved path within the workpiece; and
   an electrolyte fluid source in fluid connection with the at least one curved, hollow electrode for supplying an electrolyte to the at least one curved, hollow electrode,
   wherein the electrochemical machining assembly is configured to remove material from the workpiece upon application of the pulsed voltage to the at least one curved, hollow electrode and to the workpiece.

2. The electrochemical machining assembly of claim 1, wherein the curved, hollow electrically conductive member has a non-circular cross-section.

3. The electrochemical machining assembly of claim 1, further comprising a reservoir operatively connected to the rotational driver and to the at least one curved, hollow electrode to move the at least one curved electrode along the curved path within the workpiece, wherein the reservoir is in fluid connection with the electrolyte fluid source to receive the electrolyte from the electrolyte fluid source and to supply the electrolyte to the at least one curved, hollow electrode.

4. The electrochemical machining assembly of claim 3, wherein the rotational driver comprises:
   a shaft;
   a motor configured to rotate the shaft; and
   a collet mounted on the shaft, wherein the collet is operatively connected to the reservoir.

5. The electrochemical machining assembly of claim 3, further comprising a bus electrically connected to the power supply and to the at least one curved, hollow electrode to supply the pulsed voltage to the at least one curved, hollow electrode.

6. The electrochemical machining assembly of claim 5, wherein the bus is at least partially disposed in the reservoir.

7. The electrochemical machining assembly of claim 3, comprising a plurality of curved, hollow electrodes, wherein the reservoir defines a plurality of openings, wherein each of the curved, hollow electrodes extends through a respective one of the openings, wherein the rotational driver is operatively connected to the reservoir to move each of the curved, hollow electrodes along respective ones of a plurality of curved paths within the workpiece.

8. The electrochemical machining assembly of claim 7, wherein a plurality of the openings are disposed in a first side of the reservoir such that a plurality of the curved, hollow electrodes extend from the first side of the reservoir.

9. An electrochemical machining assembly for machining curved holes in a workpiece, the assembly comprising
a plurality of curved, hollow electrodes;
a power supply operatively connected to provide a pulsed voltage to the curved, hollow electrodes and to the workpiece;
a rotational driver operatively connected to move the curved, hollow electrodes along a curved path within the workpiece;
an electrolyte fluid source in fluid connection with the curved, hollow electrodes for supplying an electrolyte to the curved, hollow electrodes;
a reservoir operatively connected to the rotational driver and to the curved, hollow electrodes, wherein the reservoir is in fluid connection with the electrolyte fluid source to receive the electrolyte from the electrolyte fluid source and to supply the electrolyte to the curved, hollow electrodes, wherein the reservoir defines a plurality of openings, wherein each of the curved, hollow electrodes extends through a respective one of the openings, wherein the rotational driver is operatively connected to the reservoir to move each of the curved, hollow electrodes along respective ones of a plurality of curved paths within the workpiece
wherein the electrochemical machining assembly is configured to remove material from the workpiece upon application of the pulsed voltage to the curved hollow electrodes and to the workpiece,
wherein a plurality of the openings are disposed in a first side of the reservoir such that a plurality of the curved, hollow electrodes extend from the first side of the reservoir, wherein a plurality of the openings are disposed in a second side of the reservoir such that a plurality of the curved, hollow electrodes extend from the second side of the reservoir, wherein the electrodes extending from the first side of the reservoir are configured to machine a first portion of a plurality of curved holes in the workpiece, and wherein the electrodes extending from the second side of the reservoir are configured to machine a second portion of the curved holes in the workpiece.

10. The electrochemical machining assembly of claim 9, further comprising a bus electrically connected to the power supply and to each of the curved, hollow electrodes to supply the pulsed voltage to the curved, hollow electrodes, wherein the bus is at least partially disposed in the reservoir.

11. An electrochemical machining assembly for machining curved holes in a workpiece, the assembly comprising:
a plurality of curved, hollow electrodes;
a power supply operatively connected to provide a pulsed voltage to the curved, hollow electrodes and to the workpiece;
a rotational driver operatively connected to move the curved, hollow electrodes along a curved path within the workpiece;
an electrolyte fluid source in fluid connection with the curved, hollow electrodes for supplying an electrolyte to the curved, hollow electrodes;
a reservoir operatively connected to the rotational driver and to the curved, hollow electrodes, wherein the reservoir is in fluid connection with the electrolyte fluid source to receive the electrolyte from the electrolyte fluid source and to supply the electrolyte to the curved, hollow electrodes, wherein the reservoir defines a plurality of openings, wherein each of the curved, hollow electrodes extends through a respective one of the openings, wherein the rotational driver is operatively connected to the reservoir to move each of the curved, hollow electrodes along respective ones of a plurality of curved paths within the workpiece
wherein the electrochemical machining assembly is configured to remove material from the workpiece upon application of the pulsed voltage to the curved, hollow electrodes and to the workpiece, wherein at least one of the openings is disposed in a first side of the reservoir such that a respective one of the curved, hollow electrodes extends from the first side of the reservoir, wherein at least one of the openings is disposed in a second side of the reservoir such that a respective one of the curved, hollow electrodes extends from the second side of the reservoir, wherein the electrode extending from the first side of the reservoir is configured to machine a first portion of a curved hole in the workpiece, and wherein the electrode extending from the second side of the reservoir is configured to machine a second portion of the curved hole in the workpiece.

12. The electrochemical machining assembly of claim 11, further comprising a plurality of guides, wherein at least one of the guides is configured to guide the at least one curved, hollow electrode extending from the first side of the reservoir to a first initial machining point on the workpiece, and wherein at least one of the guides is configured to guide the at least one curved, hollow electrode extending from the second side of the reservoir to a second initial machining point on the workpiece.

13. The electrochemical machining assembly of claim 1, further comprising at least one guide configured to guide the at least one curved electrode to an initial machining point on the workpiece.

14. The electrochemical machining assembly of claim 12, further comprising a protective plate for removably disposing on a machining site of the workpiece, wherein the guides are mounted on the protective plate.

15. The electrochemical machining assembly of claim 1, further comprising a controller operatively connected to the rotational driver and configured to control movement of the rotational driver.

16. The electrochemical machining assembly of claim 15, wherein the controller is operatively connected to the power supply and is further configured to perform pulse train control.

17. The electrochemical machining assembly of claim 16, wherein the controller is configured to selectively control at least one of:
a feed rate for the at least one curved electrode, and
the pulsed voltage supplied to the at least one curved electrode, to form one or more turbulated ridges in a curved hole being machined in the workpiece.

18. The electrochemical machining assembly of claim 1, wherein the side surface of the curved, electrically conductive member is only partially covered with the electrically insulating coating.

* * * * *